Sept. 1, 1959 R. R. DIXON 2,901,872
REFRIGERATION APPARATUS
Filed Dec. 14, 1956 2 Sheets-Sheet 1
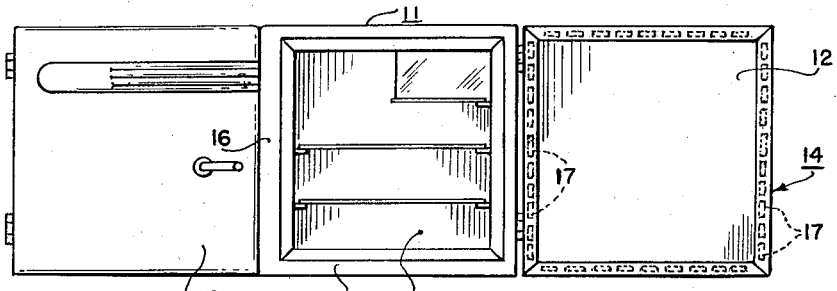
FIG.1.
FIG.2.
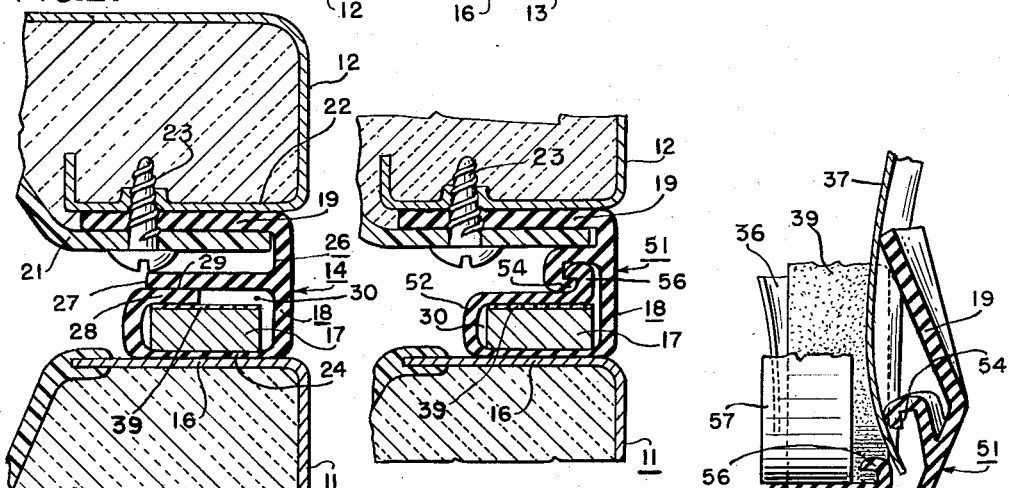
FIG.8.
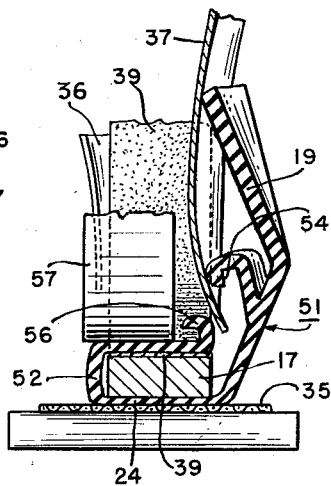
FIG.9.
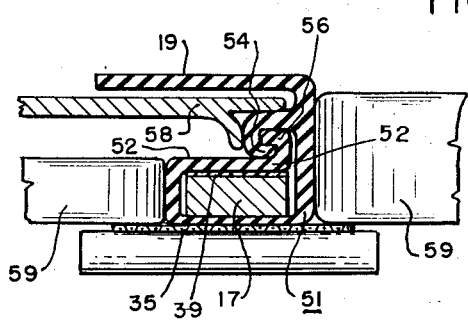
FIG.10.
INVENTOR
ROBERT R. DIXON
BY *William J. Foley*
ATTORNEY Sept. 1, 1959 R. R. DIXON 2,901,872
REFRIGERATION APPARATUS
Filed Dec. 14, 1956 2 Sheets-Sheet 2
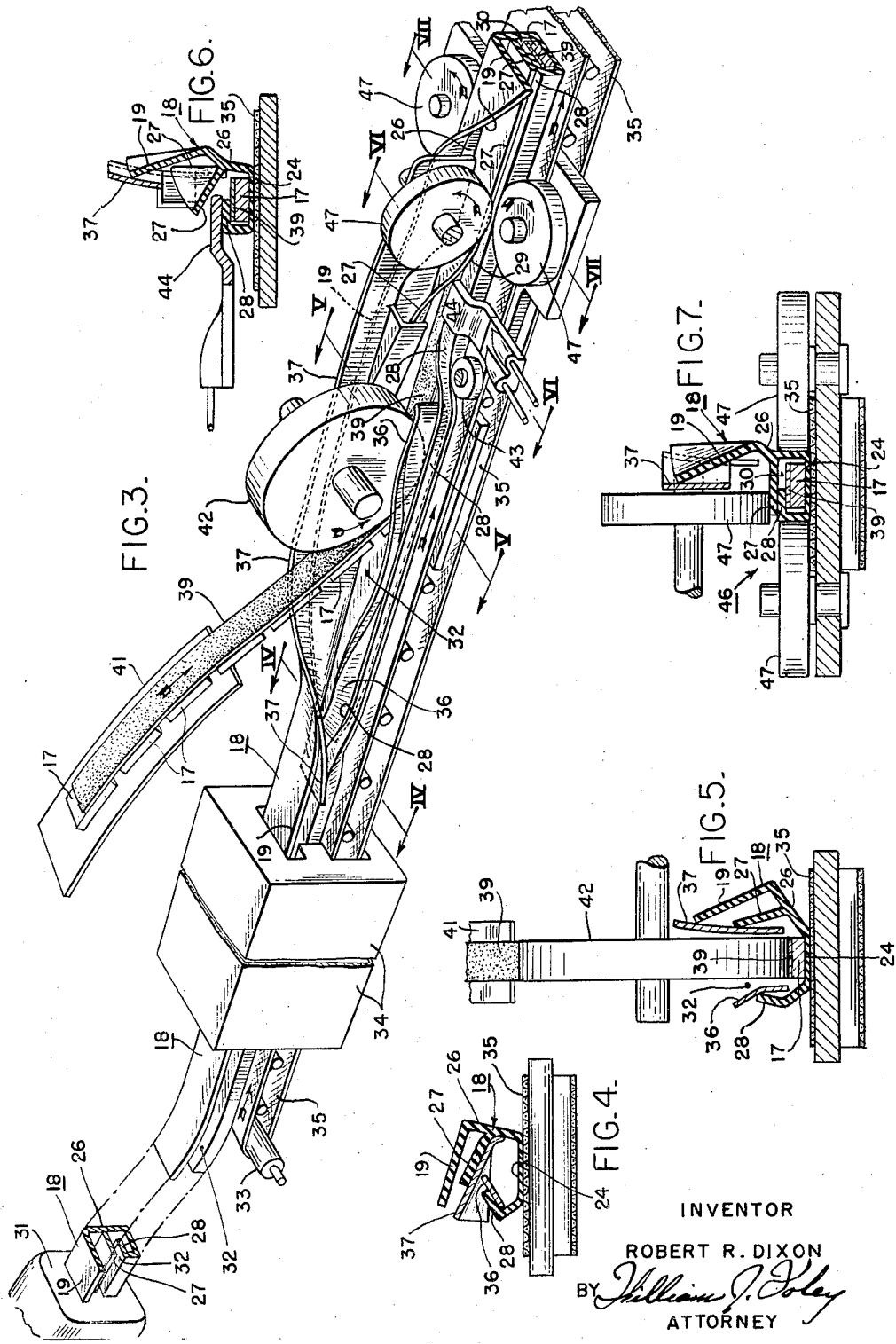
INVENTOR
ROBERT R. DIXON
BY William J. Foley
ATTORNEY United States Patent Office 2,901,872
Patented Sept. 1, 1959

2,901,872

REFRIGERATION APPARATUS

Robert R. Dixon, Upper Arlington, Ohio, assignor to Westinghouse Electric Corporation, East Pittsburgh, Pa., a corporation of Pennsylvania Application December 14, 1956, Serial No. 628,302

1 Claim. (Cl. 53—28)

This invention relates to refrigeration apparatus and more specifically to an improved magnetic gasket structure for refrigerator cabinets or the like, and to an improved method for manufacturing such gasket structures.

It has been proposed previously that a refrigerator door, or the like, be held in closed and sealing relationship to its cabinet by means of a flexible gasket containing a plurality of small permanent magnets which are attractable to the cabinet. The cost of this type of closure seal has, however, been high because of the difficulty in assembling the required large number of small magnets into the interior of the gasket.

This invention provides a method of inserting small magnets into a resilient gasket structure which lends itself to a continuous manufacturing process and which effects a number of economies in the manufacture of the magnetic gasket. Briefly, the invention contemplates extruding an elongated resilient gasket body with a continuous longitudinal opening therein, spreading the resilient walls of the gasket body, inserting a string of permanent magnets into the gasket through the enlarged opening thus formed, and thereafter closing and sealing the gasket body to retain the magnets therein.

It is therefore the principle object of this invention to provide an improved magnetic gasket structure for refrigerators or the like.

Another object of the present invention is the production of magnetic gasket structures in an economical and efficient manner.

It is a further object of this invention to provide an improved method for manufacturing refrigerator gaskets employing a plurality of magnet bodies inside the gasket.

A still further object of the invention is the provision of improved means for closing and sealing a hollow gasket body containing permanent magnets or the like.

These and other objects are effected by the invention as will be apparent from the following description and claims taken in connection with the accompanying drawings, forming a part of this application, in which:

Fig. 1 is a front view of a domestic refrigerator cabinet employing a permanent magnet gasket constructed in accordance with this invention;

Fig. 2 is a transverse sectional view through the gasket structure of this invention and illustrating the manner in which the gasket is employed on a refrigerator cabinet;

Fig. 3 is a schematic perspective view of apparatus for performing the steps of manufacture involved in the method of this invention;

Figs. 4, 5, 6 and 7 are transverse sectional views through the apparatus shown in Fig. 3, taken, respectively, as indicated by the lines IV—IV, V—V, VI—VI, VII—VII in Fig. 3, and illustrating in detail various steps in the improved method of manufacture;

Fig. 8 is a transverse sectional view through a modified gasket constructed in accordance with this invention; and Figs. 9 and 10 are transverse sectional views illustrating steps in the manufacture of the gasket shown in Fig. 8.

The refrigerator shown in Fig. 1 comprises a cabinet 11 having a pair of doors 12 on the front thereof adapted to provide access to food storage compartments 13 located within the cabinet 11. Each door 12 is equipped with a magnetic gasket 14 constructed in accordance with this invention and mounted on the periphery of the inner face of the door 12. Each gasket 14 is adapted to seat and seal against a face or frame portion 16 of the cabinet 11. This cabinet frame 16 is constructed of magnetically permeable material and is attractable to a plurality of permanent magnets 17 carried within the gasket 14.

Fig. 2 illustrates the manner in which the gasket 14 is mounted on the door 12 for cooperation with the cabinet 11. The gasket 14 comprises an elongated hollow body 18 constructed of flexible or resilient material, such as rubber or vinyl plastic. The gasket body 18 is provided with an attaching flange 19 which is held to the door 12 by being clamped between an inner pan portion 21 of the door and a shell flange 22 by fastening means, such as screws 23.

The gasket body 18 is preferably formed with a relatively thin cabinet engaging wall 24 which is pressed into sealing engagement with the cabinet face 16 by the permanent magnets 17 carried interiorly of the gasket body 18. It will be noted that the gasket body wall 26 opposite the cabinet engaging wall 24 possesses two overlapping portions 27 and 28 which are sealed together as indicated at 29 during the manufacture of the gasket, as will hereinafter be described. The completed gasket shown in Fig. 2, therefore, includes an interconnected series of wall portions, including the walls 24 and 26, which define a closed chamber 30 for housing the permanent magnets 17.

Fig. 3, on the second sheet of the drawings, illustrates, somewhat schematically, a method envisioned by this invention for manufacturing the gasket 14 described above. The process flow is from left to right on the apparatus shown in Fig. 3 and commences with the issuance of the raw gasket body 18 of vinyl plastic or the like from an extrusion die 31. The extrusion process for forming refrigerator gaskets is well understood by those skilled in the art and no detailed description thereof is deemed necessary here. The gasket body 18 is preferably shaped by the extrusion die 31 in such a manner that the overlapping portions 27 and 28 of the back wall 26 thereof are spaced apart in a manner to define a continuous longitudinal break or opening 32 in the wall 26 of the gasket body 18. The gasket body 18 extruded from the die 31 is picked up on a moving belt 35 which is driven by any suitable means such as the powered end roller 33. This moving belt 35 carries the gasket body 18 into and through a treatment chamber indicated at 34 wherein the gasket body is treated to improve the resiliency and wear qualities of the gasket material. If rubber type material is employed in the gasket body the chamber 34 will comprise a heating oven for curing the material. In the case of vinyl plastic gaskets, the chamber 34 includes suitable means for cooling the gasket after it is extruded.

Upon leaving the treating chamber 34 the gasket body 18 is moved by the belt 35 past a pair of diverging spreader plates 36 and 37. The particular configuration of the spreader plates 36 and 37 will vary depending upon the configuration of the gasket body 18 and the spreader plates 36 and 37 shown in the drawings should therefore be considered merely as illustrative. The purpose of the spreader plates 36 and 37 is to widen or enlarge the longitudinal opening or break 32 in the gasket body 18 sufficiently to permit insertion of the permanent magnets 17 into the interior of the gasket body. The manner in which the spreader plates 36 and 37 enlarge the gasket body opening 32 is shown in Figs. 3, 4 and 5. The configuration of the spreader plate 36 is such as to engage the inner surface of the gasket wall portion 28 to lift and move this wall portion 28 away from the longitudinal centerline of the gasket body 18 as the gasket body is moved past the spreader plates. The other spreader plate 37 is adapted to engage and lift another gasket wall portion 27 and the gasket mounting flange 19 to move these portions of the gasket body 18 up and away from the longitudinal centerline of the gasket body as it is moved past the spreader plates (see Figs. 4 and 5). Near the point of maximum divergence of the spreader plates 36 and 37 (approximately the section line V—V) the opening 32 in the gasket body 18 is sufficiently wide to enable the magnets 17 to be fed therethrough.

Referring to Fig. 3, the magnets 17 are preferably connected into a continuous chain or belt by means of an elongated tape 39 prior to assembly within the gasket body 18 and are then fed from a supply chute 41 through the gasket body opening 32 and preferably under a roller 42 which seats the magnets 17 within the gasket body chamber 30 and against the body wall 24 (see Fig. 5). The feeding rate of the belt of magnets 17 is adjusted to the speed of the gasket propelling belt 35 in such a manner that a continuous string of magnets 17 is fed into the gasket body 18 as it passes the spreader plates 36 and 37.

Following insertion of the magnets 17 into the interior of the gasket body 18, the gasket body is moved beyond the end of the spreader plate 36 acting on the gasket wall portion 28. The natural resiliency of the gasket body 18 causes this portion 28 of the gasket body wall to return to its original shape and overlap the back of the magnets 17. If desired, an idler roller 43 may be positioned alongside the path of movement of the magnet body 18 to assist this wall portion 28 of the gasket in returning to its original shape. Continuing the assembly process, the gasket body 18 is moved past an electrically heated blade 44 adapted to engage the outer surface of the gasket wall portion 28 to soften and render adhesive this portion of the gasket body 18 (see Fig. 6). At this stage, the other portion 27 of the gasket body wall 26 has also moved beyond the end of its spreader plate 37 and may, if desired, also be brought into contact with the heated blade 44. Thereafter, and while the gasket wall portion 28 is still tacky from having been heated by the blade 44, the gasket body is passed through a jig structure 46 consisting of a number of guide rollers 47 which reshape the gasket body 18 to its original configuration as extruded and, furthermore, press the gasket wall portions 27 and 28 into engagement with each other to close the opening 32 therein and seal the magnets 17 within the gasket chamber 30 (see Fig. 7). The previously heated engaging surfaces of the wall portions 27 and 28 become bonded when pressed together.

The completed gasket 14 is thereafter conveyed by the belt 35 to suitable cutting and shaping machinery (not shown) where it may be cut into lengths and joined to the configuration required for its particular application.

Figs. 8, 9 and 10 illustrate a modified magnetic gasket 51 capable of being manufactured in accordance with this invention. As in the case of the gasket 14 previously discussed, this modified gasket 51 employs an elongated hollow body portion 18 having a flange 19 secured thereto and by means of which it may be attached to a refrigerator door 12. The gasket 51 has a chamber 30 in which are disposed a plurality of permanent magnets 17. The magnets 17 are inserted into the gasket 51 through one wall 52 thereof having a separable connection therein comprising two hook-like, interlocking wall portions 54 and 56. The body 18 of the gasket 51 is extruded in the manner previously described with the interlocking portions 54 and 56 of the body wall 52 separated slightly from one another in a manner to provide a continuous longitudinal break or opening in the wall 52. The magnets 17 are then assembled within the gasket 51 and the wall 52 closed by means of apparatus similar to that shown in Fig. 3 and described above. Unlike the previously described gasket 14, this modified gasket 51 does not require the heating of wall portions of the gasket body 18 and consequently the heater 44 shown in Fig. 3 need not be employed in assembling the gasket 51. The gasket 51 is moved past a pair of spreader plates similar to those identified as 36 and 37 in Fig. 3 and a chain or string of magnets 17 is fed into the enlarged longitudinal opening in the wall 52 thereof. The gasket 51, with the magnets 17 therein, is thereafter passed through jig structures, such as those illustrated in Figs. 9 and 10 to direct the hook portions 54 and 56 of the gasket wall 52 into interlocking engagement. Fig. 9 illustrates one step in the closing of the gasket wall 52 wherein a roller 57 is employed to press one hook portion 56 of the gasket wall down against the magnet body 17. Fig. 10 illustrates the use of a presser plate 58 to force the other hook portion 54 into engagement with hook portion 56, while the gasket 51 is moved between a pair of guide rollers 59. The gasket 51 is carried through these successive stages of assembly by means of the moving belt 35 described above.

It will be apparent from the foregoing that this invention provides an improved method for manufacturing a gasket structure having a plurality of permanent magnets located therein. The unique features of the gasket itself and the novel method of assembly thereof make it possible to manufacture magnetic gaskets more quickly and economically than was heretofore possible.

While two embodiments of the invention have been illustrated, it will be obvious to those skilled in the art that it is not so limited but is susceptible of various other changes and modifications without departing from the spirit thereof.

What is claimed is:

The method of manufacturing refrigerator gaskets or the like comprising the steps of forming an elongated hollow body of resilient material with a continuous longitudinal opening therein and longitudinal interlocking portions disposed on either side of said opening, spreading apart said interlocking portions of said body to enlarge the opening therein for permitting ingress to the interior of said body, inserting a plurality of magnet members through the enlarged opening thus formed and into the interior of said body and thereafter passing said elongated body through a jig structure adapted to close said opening in said body and to guide said interlocking portions of the body into locked engagement.

References Cited in the file of this patent

UNITED STATES PATENTS

| | | |
|---|---|---|
| 2,615,200 | Cloud | Oct. 28, 1952 |
| 2,628,464 | Plate et al. | Feb. 17, 1953 |
| 2,649,035 | Cloud | Aug. 18, 1953 |